No. 835,206. PATENTED NOV. 6, 1906.
H. W. THOMASSON.
COMBINED LAND ROLLER AND CORN PLANTER.
APPLICATION FILED MAR. 26, 1906.
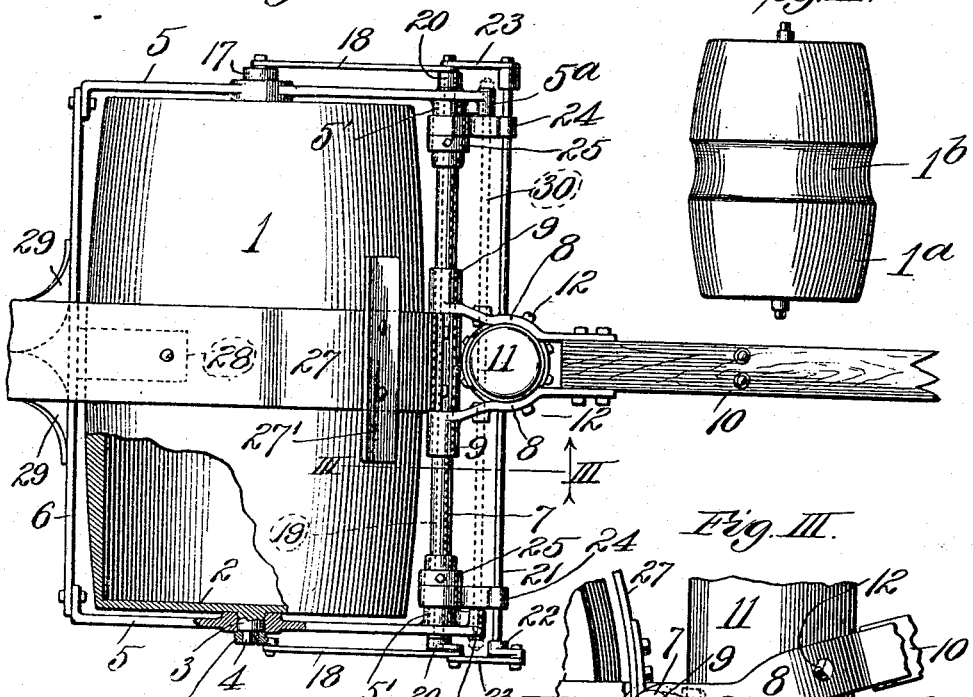
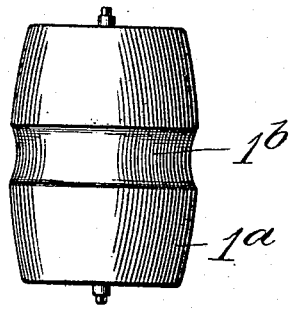
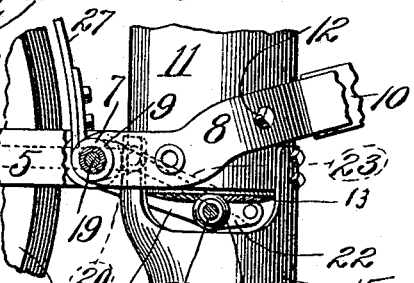
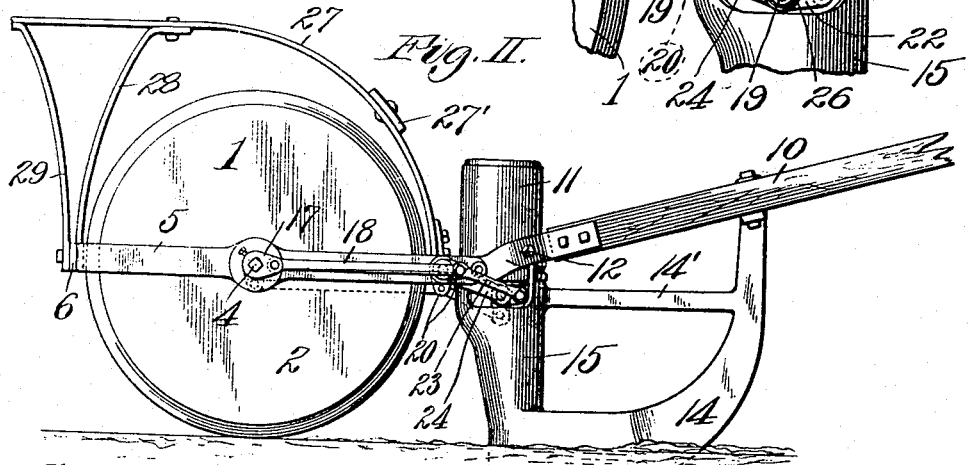

UNITED STATES PATENT OFFICE.

HUGH W. THOMASSON, OF ST. LOUIS, MISSOURI.

COMBINED LAND-ROLLER AND CORN-PLANTER.

No. 835,206.  Specification of Letters Patent.  Patented Nov. 6, 1906.

Application filed March 26, 1906. Serial No. 308,173.

*To all whom it may concern:*

Be it known that I, HUGH W. THOMASSON, a citizen of the United States, residing in the city of St. Louis and State of Missouri, have invented certain new and useful Improvements in a Combined Land-Roller and Corn-Planter, of which the following is a full, clear, and exact description, reference being had to the accompanying drawings, forming part of this specification.

My invention relates to an agricultural implement combining a land-roller and corn-planting mechanism geared to said roller, whereby in the use of the implement corn may be planted in rows without the use of a check-wire or any check-row mechanism and also whereby the soil may be pulverized during the process of planting the corn.

Figure I is a top or plan view of my combined implement with parts shown in horizontal section. Fig. II is a side elevation of the implement. Fig. III is a vertical cross-section taken on line III III, Fig. I, looking in the direction of the arrow crossing said line and showing parts adjacent to said line in elevation. Fig. IV is a modification of the roller used in my implement.

1 designates a roller of barrel shape or, in other words, of a structural form combining heads 2 at its ends and an external peripheral surface that is of convex shape in a direction longitudinally of the roller. The roller is thus made of greater thickness and weight at its longitudinal center than at its ends and of hollow form. Projecting from each head 2 of the roller is a circular boss 3, that terminates in a non-circular neck 4. The utility of these members will hereinafter appear.

5 designates a pair of end frame members that are located adjacent to the heads of the roller and are apertured intermediate of their ends to receive the bosses 3 and provide journals therefor. The rear ends of the frame members 5 are united by a tie-bar 6, bolted or otherwise suitably secured to said frame members and by which they are in part held in alinement with the heads of the roller 1. Formed integral with or rigidly attached to the frame members 5 near their forward ends are socket-arms 5', that extend inwardly from the inner or facing sides of said frame members. These socket-arms receive a sleeve 7, which is rigidly mounted therein and which serves to tie the forward ends of the frame members to each other.

8 designates a pair of swinging arms that are provided at their rear ends with boxes 9, which are loosely fitted to the sleeve 7 in order that said arms may turn on said sleeve.

10 is a draft-tongue to which the swinging arms 8 are secured and to which horses or other animals may be hitched.

11 designates a seedbox, which is detachably mounted between the swinging tongue-receiving arms 8 by means of set-screws 12, in order that it may be readily put in position and removed when desired. This seedbox may be provided with the usual valve mechanism. (Not shown and for which no invention is herein claimed.) The valve mechanism is preferably controlled by a bevel-pinion 13, (see Fig. III,) that is operated through the medium of mechanism about to be explained.

14 designates a furrow-opening shoe, the forward end of which is bolted to the draft-tongue 10 and at the rear end of which is a seed-receiving chute 15, located immediately beneath the seedbox 11. The chute of the shoe is attached to the seedbox 11 at its upper end and the chute is connected to the runner of the shoe by a brace 14'.

17 designates crank-arms that are secured to the non-circular necks 4 of the bosses 3, projecting from the heads of the roller 1, these crank-arms being offset from each other for the purpose of avoiding the occurrence of a dead-center with reference to the action of the arms during the rotation of said roller.

18 designates main pitmen, the rear ends of which are loosely fitted to the outer ends of the crank-arms 17.

19 is a revoluble shaft loosely mounted in the forward ends of the end frame members 5 and in the sleeve 7, supported by the socket members of said end frame members. The shaft 19 has fixed to it at each of its ends a crank-arm 20, said crank-arms being offset from each other to avoid the occurrence of a dead-center. The crank-arms 20 have fitted to their outer ends the pitmen 18.

21 designates a seedbox-valve-operating rod, to the ends of which are secured crank-arms 22.

23 designates subpitmen, the ends of which are loosely fitted to the outer ends of the crank-arms 20 and 22, the latter of which, like the former, are so affixed to their shaft as to avoid the occurrence of a dead-center. The shaft 21 is supported by a pair of swinging hanger-arms 24, that are loosely fitted to the socket members 5', and in which the shaft 21 is journaled. The arms 24 are confined on the members 5' by set-collars 25. The valve-operating shaft 21 may be supported in conjunction with the seedbox 11 by any suitable means, and it may be geared to the valve mechanism of said seedbox by any suitable means, such as the bevel-pin 26, (see Fig. III) that meshes with the bevel-pinion 13.

27 designates a seat-supporting member, the forward end of which is clamped to the sleeve 7 and serves to hold the tongue-receiving arms 8 in a separated condition and from movement in a longitudinal direction on said sleeve. This seat-supporting member is of arch shape and extends rearwardly above the roller 1 and may have applied thereto a seat of any usual form. On the seat-supporting member is a foot-rest 27'. The seat-supporting member 27 is in turn supported by a forward brace 28 and a pair of outwardly-divergent brace-arms 29, that are attached to said member and to the rear tie-bar 6.

It may be found desirable at times to utilize my roller individually and without the corn-planting mechanism associated therewith, and this may readily be done by removing the corn-planting mechanism. In such instance a tie-rod 30 (see dotted lines, Fig. I) may be applied to the end frame members 5 to unite their forward ends in a manner similar to that in which they are united by the rear tie-bar 6. When this forward tie-bar is used, it is movably mounted in extensions 5ª, carried by the end frame members. The rod is also passed through the tongue-connecting arms for the purpose of holding said tongue rigidly relative to the frame of the implement.

In the practical use of my combined roller and corn-planter, the roller rides upon the ground, and due to its barrel shape or convex shape and heaviest at its longitudinal center it acts upon the ground with greater pressure at its center than at its ends. As the roller rotates it carries therewith the crank-arms 17, fixed to its bosses, and as a result the main pitmen 18 are reciprocated. The pitmen during their reciprocation act upon the crank-arms 20, carried by the revoluble shaft 19, and rotate said crank-arms, with the result of imparting reciprocation to the subpitmen 23 and rotation to the crank-arms 22, fixed to the seedbox-valve-operating shaft 21. It will be seen that by the described connections the seed is caused to be dropped from the seedbox with uniformity, while at the same time the ground over which the implement is operated is being rolled. It will also be seen that due to the draft-tongue-receiving arms 8 being loosely fitted to the framework of the implement the tongue may move independently of the framework, and that therefore the seedbox and the valve mechanism associated therewith are unaffected by the passage of the roller 1 over uneven ground or obstructions that may be encountered.

In Fig. IV, I have shown a modification in which the roller 1ª is provided with an annular concave groove 1ᵇ, located centrally thereof, thereby presenting in the roller the same feature of merit that is found in the ground-wheels of corn-planters which have concave tread-rims.

I claim—

1. In an implement of the character described, the combination of a frame, a land-roller having bosses at its ends journaled in said frame, a tongue swingingly connected to said frame, a seedbox supported by said tongue, and mechanism for actuating the valve mechanism of said seedbox connected to the bosses of said land-roller, substantially as set forth.

2. In an implement of the character described, the combination of a frame, a land-roller having bosses at its ends journaled in said frame, a tongue swingingly connected to said frame, a seedbox supported by said tongue, a valve-operating rod supported by said frame and located in proximity to said seedbox, and pitman connection between said valve-operating rod and the bosses of said land-roller, substantially as set forth.

3. In an implement of the character described, the combination of a frame, a land-roller having bosses at its ends journaled in said frame, a tongue swingingly connected to said frame, a seedbox supported by said tongue, a valve-operating rod associated with said seedbox, a revoluble shaft supported by said frame, crank-arms carried by said shaft and by the bosses of said land-roller, and pitmen connecting said crank-arms, substantially as set forth.

4. In an implement of the character described, the combination of a frame, a land-roller having bosses at its ends journaled in said frame, a tongue swingingly connected to said frame, a seedbox supported by said tongue, a valve-operating shaft associated with said seedbox and having crank-arms at its ends, swinging hanger-arms loosely fitted to said frame and in which said valve-operating rod is journaled, a revoluble shaft mounted in the portion of said frame to which said hanger-arms are fitted, crank-arms carried by said last-named shaft, crank-arms carried by the bosses of said land-roller, pitmen connecting the crank-arms of said shaft and the crank-arms of said roller, and subpitmen connecting the crank-arms of said last-named shaft to the crank-arms of said valve-operating shaft, substantially as set forth.

HUGH W. THOMASSON.

In presence of—
BLANCHE HOGAN,
H. G. COOK.